United States Patent [19]
Hasebe

[11] Patent Number: 5,097,327
[45] Date of Patent: Mar. 17, 1992

[54] APPARATUS FOR DETECTING A MOVING OBJECT IN A MOTION PICTURE SEQUENCE

[75] Inventor: Atsushi Hasebe, Kanagawa, Japan

[73] Assignee: Sony Corporation, Japan

[21] Appl. No.: 528,548

[22] Filed: May 25, 1990

[30] Foreign Application Priority Data

May 30, 1989 [JP] Japan .................................. 1-137231

[51] Int. Cl.$^5$ .......................... H04N 7/18; H04N 7/00
[52] U.S. Cl. ...................................... 358/105; 358/96
[58] Field of Search ...................... 358/96, 105, 140, 1

[56] References Cited

U.S. PATENT DOCUMENTS

| | | | |
|---|---|---|---|
| 4,124,871 | 11/1978 | Morrin, II | 358/96 |
| 4,663,665 | 5/1987 | Tanaka et al. | 358/140 |
| 4,733,300 | 3/1988 | Sugiyama et al. | 358/140 |
| 4,805,018 | 2/1989 | Nishimura | 358/105 |
| 4,912,556 | 3/1990 | Hirauchi et al. | 358/96 |
| 5,005,078 | 4/1991 | Gillard | 358/140 |

FOREIGN PATENT DOCUMENTS 0224253  3/1987  European Pat. Off. .
62-118480  5/1987  Japan .

OTHER PUBLICATIONS

Technical Document Presented Sep. 30, 1988, H. Ueno et al., Entitled, "A Method of Moving Region Extraction Using Background Memory".
Technical Document Presented Nov. 21, 1985, A. Hasebe et al., Entitled, "SIPS: A Multiprocessor System for Video Image Processing".

*Primary Examiner*—John K. Peng
*Attorney, Agent, or Firm*—Ronald P. Kananen

[57] ABSTRACT

An apparatus for to extracting a video signal corresponding to a moving object in a video signal representing moving and stationary object comprises means for detecting a contour in the video signal and storing the contour data of successive frame in two frame buffers. Contour data stored in the two frame buffers are compared with each other so that a transition between corresponding portions of the two frame buffers are detected. This transition image is also stored in another memory and additional pixel transitions are interpolated at pixels having adjacent transitions. Thereafter, an area encompassed by the pixels representing the transition is combined with the video signal so that a motion video signal can be extracted.

10 Claims, 9 Drawing Sheets

FIG. 7
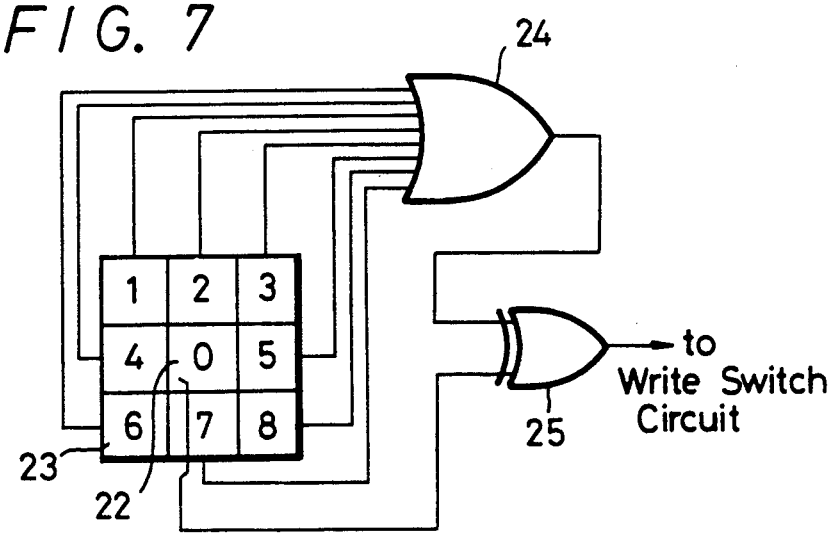
FIG. 8A Original Image
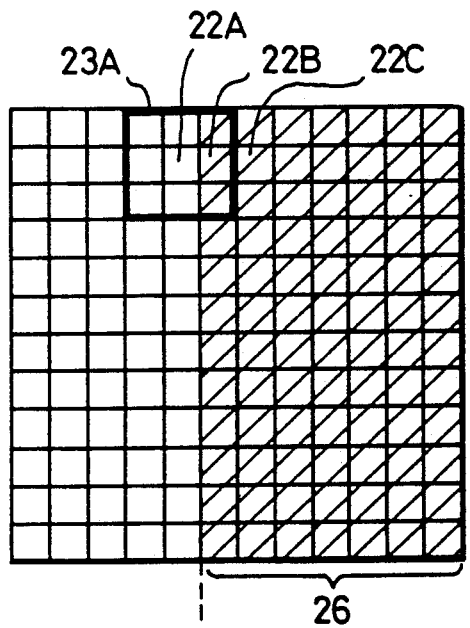
FIG. 8B Contour Data
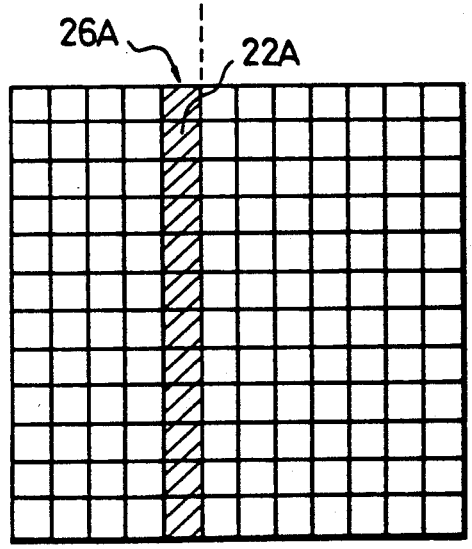

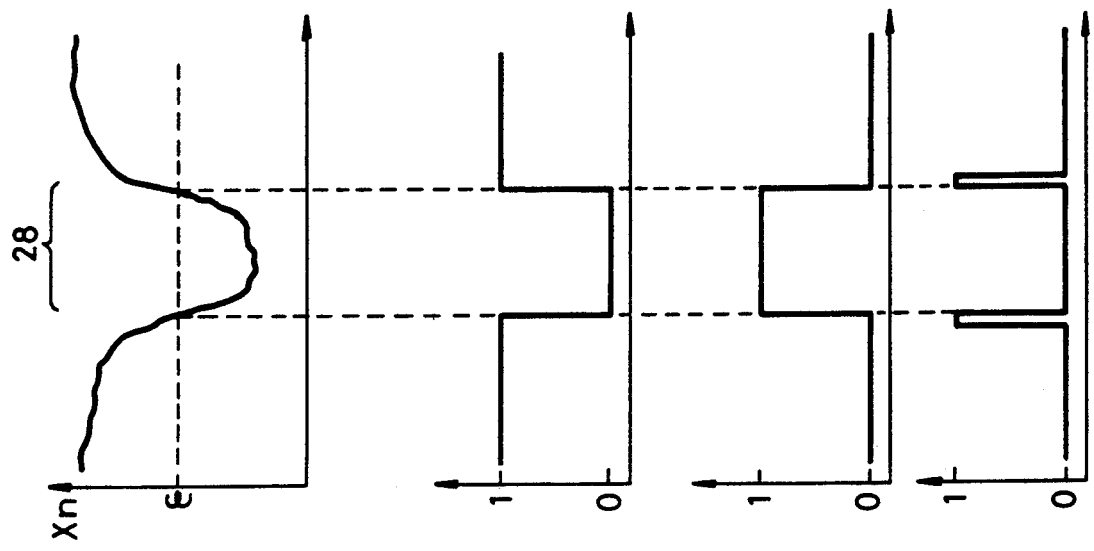
FIG. 12A
FIG. 12B
FIG. 12C
FIG. 12D
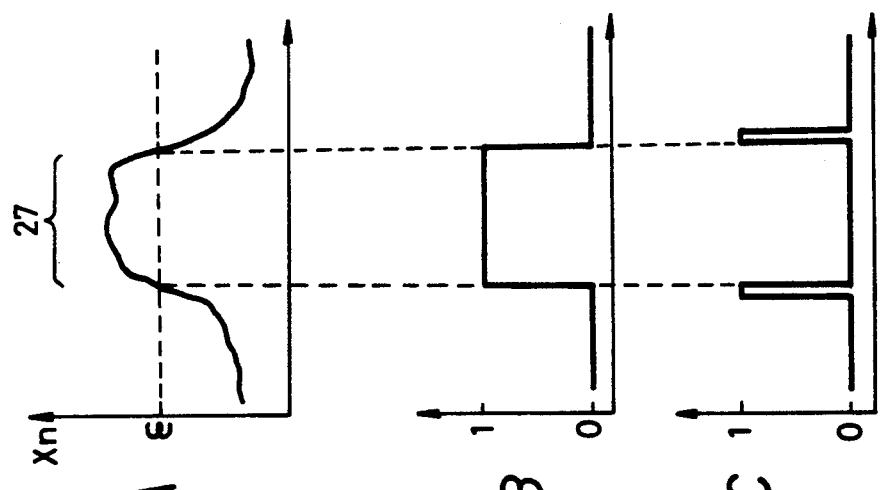
FIG. 11A
FIG. 11B
FIG. 11C

APPARATUS FOR DETECTING A MOVING OBJECT IN A MOTION PICTURE SEQUENCE

BACKGROUND OF THE INVENTION

1. Field of the Invention

The present invention relates to an apparatus for detecting a moving object in a motion picture sequence, and is directed more particularly to an apparatus for extracting a moving object from, for example, a color video image.

2. Description of the Prior Art

Apparatus for detecting moving objects has been used, for example, to extract a picture of a live heart from a color video image of a living organism.

A particular method for detecting a moving object from such a color video image, has been proposed in Japanese Laid-Open Patent Application No. 62-118480. According to this disclosure, a background image is formed in a pre-determined manner, and this background image is compared with a current image, whereby a difference image having a deviation larger than a pre-determined threshold value is extracted to provide an image of a moving object.

FIG. 1 shows a functional block diagram of an image processing apparatus which detects a moving object by utilizing such a background image according to the prior art.

Referring to FIG. 1, a video camera 1 generates a color video signal corresponding to the n'th frame of an original image sequence. This color video signal is passed through an analog-to-digital (A/D) converter 2 and a video signal processing circuit (not shown), in which it is converted and processed to provide three digital red, green and blue (R, G, B) primary color video signals $x_n^R$, $x_n^G$ and $x_n^B$. These video signals $x_n^R$, $x_n^G$ and $x_n^B$ are written to a video image memory 3 at predetermined locations. The video image memory 3 is formed by a frame buffer that can store the 8-bit RGB video signal representing an original image made up of, for example, 768 (horizontal)×512 (vertical) pixels. These RGB video signals $x_n^R$, $x_n^G$ and $x_n^B$ will hereinafter be referred to as a color video signal $x_n$ for simplicity.

The color video signal $x_n$ is read out from the video image memory 3 and input to a subtracting input terminal of an accumulator circuit 4 and to a subtracting input terminal of an extractor circuit 5.

A video image memory 6 having a storage capacity identical to that of the video image memory 3 is also provided for processing the background image. To this video image memory 6, are written RGB video signals $y_n^R$, $y_n^G$ and $y_n^B$ representing the n'th frame of a background image. These RGB video signals $y_n^R$, $y_n^G$ and $y_n^B$ will hereinafter be simply referred to as a color video signal $y_n$. A color video signal of the immediately preceding frame, i.e., a color video signal $y_{n-1}$ representing the (n-1)'th frame read out from the video image memory 6 is input to an adding input terminal of the accumulator circuit 4 and an adding input terminal of the extractor circuit 5.

The accumulator circuit 4 generates a video signal $y_n$ representing the n'th frame of the background image from the video signal $x_n$ of the n'th frame of the current original image and the video signal $y_{n-1}$ of (n-1)'th frame of background image from the preceding frame by means of the following equation $$y_n = y_{n-1} - c \quad (y_{n-1} - x_n \geq 0)$$
$$y_{n-1} + c \quad (y_{n-1} - x_n < 0)$$

In equation (1) above, c represents a constant of approximately one least significant bit (1 LSB). The video signal $y_n$ generated by the accumulator circuit 4 on the basis of the equation (1) is input to the video image memory 6, to which it is written as the n'th frame of the video signal of the background image. Accordingly, regardless of sudden changes in the original image, the background image is gradually changed by about 1 LSB each frame. Therefore, it is to be appreciated that the background image is generated by removing the moving object from the original image.

Furthermore, the extractor circuit 5 generates an n'th frame motion picture video signal zn ($z_n^R$, $z_n^G$ and $z_n^B$) from the (n-1)'th background image video signal $y_{n-1}$ and the n'th frame original image picture video signal $x_n$ by means of the following equations.

$$z_n^R = x_n^R \quad (|y_{n-1}^R - x_n^R| \geq \delta \text{ or} \qquad (2)$$
$$|y_{n-1}^G - x_n^G| \geq \delta^G \text{ or}$$
$$|y_n^B - x_n^B| \geq \delta^B)$$
$$d^R \text{ (otherwise)}$$

$$z_n^G = x_n^G \text{ (under the same condition as that of the upper} \qquad (3)$$
$$\text{row of equation (2))}$$
$$d^G \text{ (otherwise)}$$

$$z_n^B = x_n^B \text{ (under the same condition as that of the lower} \qquad (4)$$
$$\text{row of equation (2))}$$
$$d^B \text{ (otherwise)}$$

where $\delta^R$, $\delta^G$, and $\delta^B$ represent threshold values determined with respect to the three primary color signals R, G and B, respectively, and $d^R$, $d^G$ and $d^B$ are constants, respectively.

More specifically, an image area in which the difference between the background image and the current image exceeds a predetermined threshold value with respect to any one of the three primary color signals R, G and B is identified as a moving image and an current image thereof is extracted, whereas other portions are replaced with a pre-determined color (e.g., black, raster pattern or the like).

The thus generated video signal $z_n$ representing the moving image is written to a moving image video image memory 7, and the video signal $z_n$ is read out from this video image memory 7 and passed through a digital-to-analog (D/A) converter 8 to a color display monitor 9. Consequently, the color display monitor 9 displays the moving image on a background of the pre-determined color.

According to the example of the prior art shown in FIG. 1, if an original picture sequence is provided wherein, as shown in FIG. 2A, a toy train 10 constitutes a moving object running along a fixed track, a video signal $x_o$ representing an original image 3A at a point in time of FIG. 2A is written to the video image memory 6 as a video signal $y_o$ representing a background picture 6A. Thereafter, as the video signal $x_n$ of the original picture is updated at, for example, a frame frequency of 30 Hz, the video signal $y_n$ representing the background image is also updated at the frame frequency of 30 Hz in accordance with equation (1) above. After a pre-determined period of time (e.g., after 4 seconds), the toy train 10 in the background image 6B corresponding to the video signal $y_n$ is partly erased. Finally (e.g., after 20 seconds), the toy train 10, which is a moving object in the background image 6C, is completely erased as shown in FIG. 2C.

Furthermore, the video signal $z_n$ is extracted from the video signal $y_n$ representing the background image shown in FIG. 2C and the video signal $x_n$ representing the original image, which is provided after a pre-determined period, i.e., 20 seconds as shown in FIG. 2A, according to the above-described equations (2) to (4). Consequently, a moving image (displayed on the color display monitor 9) 7A corresponding to the video signal $Z_n$ is represented as shown in FIG. 3. It will be seen in FIG. 3 that only the toy train 10 in the original image is extracted and displayed as a moving object.

The above-described prior-art method in which a background image is generated and the moving object is extracted by means of some sort of difference between the background image and a current image, however, can not avoid the following disadvantages:

(i) The background video image memory must have the same storage capacity as that of the current video image memory with the consequence that the image processing apparatus is expensive;

(ii) The moving object can not be erased rapidly from the background image and the convergence is slow, so that it is impossible to detect a moving object immediately after a current image is input; and (iii) If a moving object in the original picture 3A is a complete moving object which shuttles between two completely separate positions 12A and 12B as shown in FIG. 4A, then a moving object 11 is displayed in the resultant moving image 7A in the original, complete form as shown in FIG. 4B. However, if the moving object in the current image 3A is a partially moved object which shuttles between two very close positions 14A and 14B, producing an overlapping portion 15 as shown in FIG. 5A, then a partly broken portion 13A occurs in the moving object 13 in the resultant moving picture 7A as shown in FIG. 5A.

Besides the above-described example of the prior art, various other methods have been proposed in the past to detect a moving object. However, each of them requires a background video image memory whose storage capacity is substantially the same as that of the original video image memory. Consequently none of them can avoid the shortcomings and disadvantages (i) and (ii) pointed out above.

OBJECTS AND SUMMARY OF THE INVENTION

Accordingly, it is a general object of the present invention to provide an improved apparatus for detecting a moving object in a motion picture sequence in which the above described shortcomings and disadvantages experienced in the prior art can be eliminated.

More specifically, it is an object of the present invention to provide an apparatus for detecting a moving object in a motion picture sequence in which a background image need not be generated and a moving object can be detected using a current image of a subsequent frame.

Another object of the present invention is to provide an apparatus for detecting a moving object in a motion picture sequence in which a partially moved object can be detected accurately.

Still another object of the present invention is to provide an apparatus for detecting a moving object in a motion picture sequence in which the storage capacity of a video image memory used for processing the video image can be reduced to ⅔ of that needed in prior art methods.

According to a first aspect of the present invention, an apparatus for detecting a moving object in a motion picture sequence is comprised of an input terminal for receiving a motion picture signal, a first memory device for storing the motion picture signal in a digital form, a circuit connected to the first memory device for extracting a contour signal from the motion picture signal, second and third memory devices for storing the contour signal extracted from each of two successive frames of the motion picture signal, respectively, a fourth memory device for storing data of a transition generated by comparing the contour signals stored in the second and third memory devices, an interpolating circuit connected to the fourth memory device for interpolating an output signal of the fourth memory device so that a new transition is generated at a pixel position located between pixels having a transition, and a circuit for combining output signals of the interpolating circuit and the first memory device so that only a moving object in the motion picture sequence can be detected.

As a second aspect of this invention, an apparatus for detecting a moving area in a video signal is comprised of an input terminal for receiving the video signal in a digital form, an extractor circuit for extracting a contour signal from the video signal, a circuit for detecting a transition between corresponding pixels of two successive frames of the extracted contour signal, an interpolator circuit for interpolating a transition at a pixel having no transition when a transition occurs in the vicinity of the pixel, and a circuit for combining output signals of the interpolator circuit and the input terminal so that the moving area in the video signal is detected.

The preceding, and other objects, features and advantages of the present invention, will be apparent in the following detailed description of a preferred embodiment when read in conjunction with the accompanying drawings, in which like reference numerals are used to identify the same or similar parts in the several views.

BRIEF DESCRIPTION OF THE DRAWINGS

FIG. 7 is a schematic diagram illustrating the function of the contour data extractor circuit used in the present invention;

FIGS. 8A and 8B are schematic diagrams illustrating the contour data extracting operation of the contour data extracting circuit shown in FIG. 7;

FIGS. 11A to 11C and FIGS. 12A to 12D are schematic diagrams illustrating the contour data extracting operation of the apparatus shown in FIG. 6, respectively.

DETAILED DESCRIPTION OF A PREFERRED EMBODIMENT

An embodiment of an apparatus for detecting a moving object in a motion picture sequence according to the present invention will hereinafter be described with reference to FIGS. 6 to 13.

Figure 1:
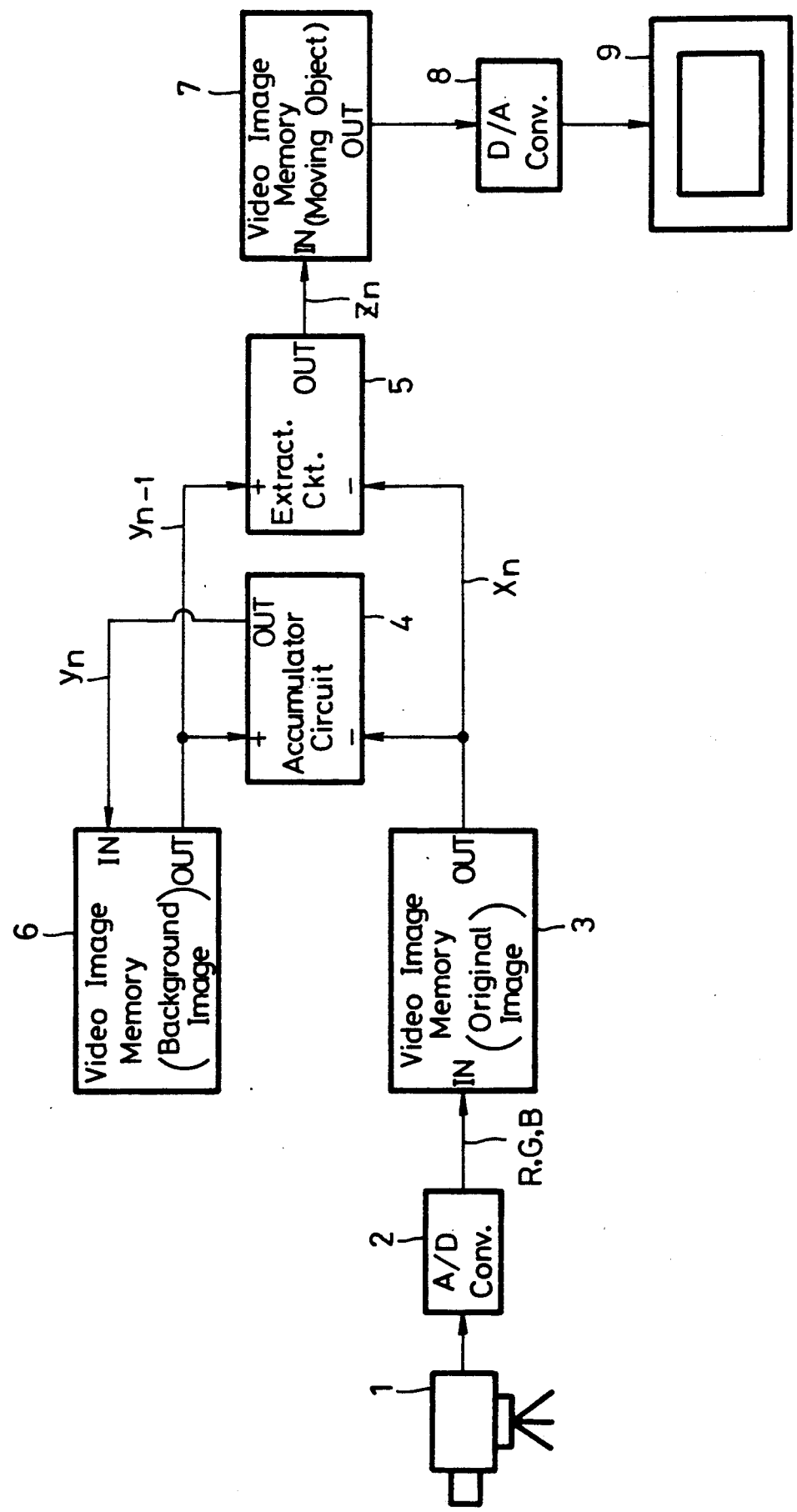
FIG. 1 is a functional block diagram showing an example of a prior-art image processing apparatus.
Figure 2A:
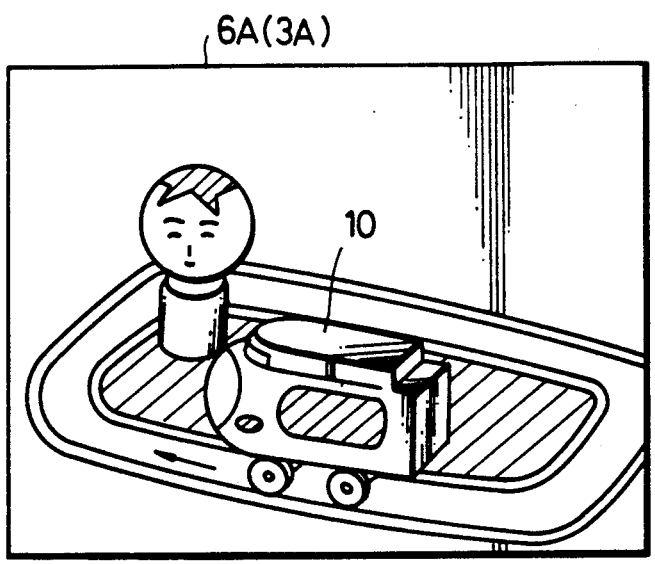
FIGS. 2A to 2C, FIG. 3, FIGS. 4A and 4B and FIGS. 5A and 5B are schematic diagrams illustrating the operation of the prior-art image processing apparatus shown in FIG. 1, respectively; 10
Figure 2B:
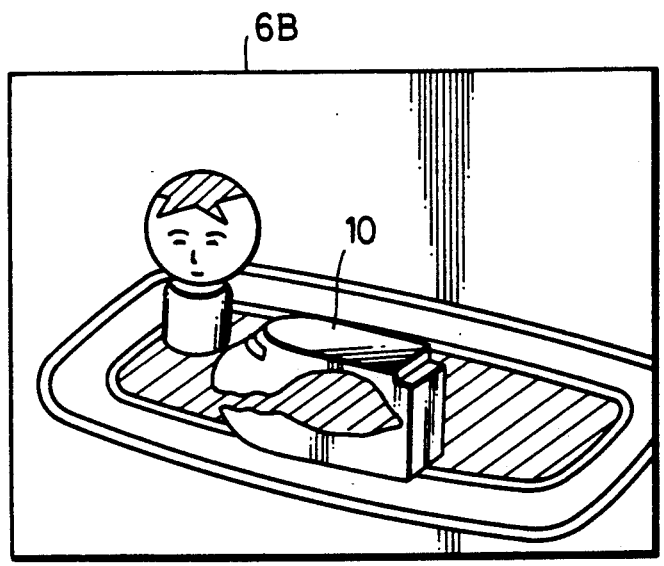
Figure 2C:
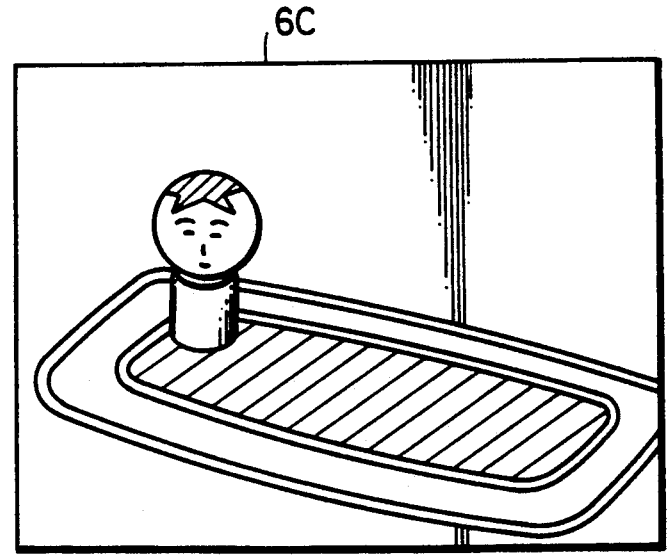
Figure 3:
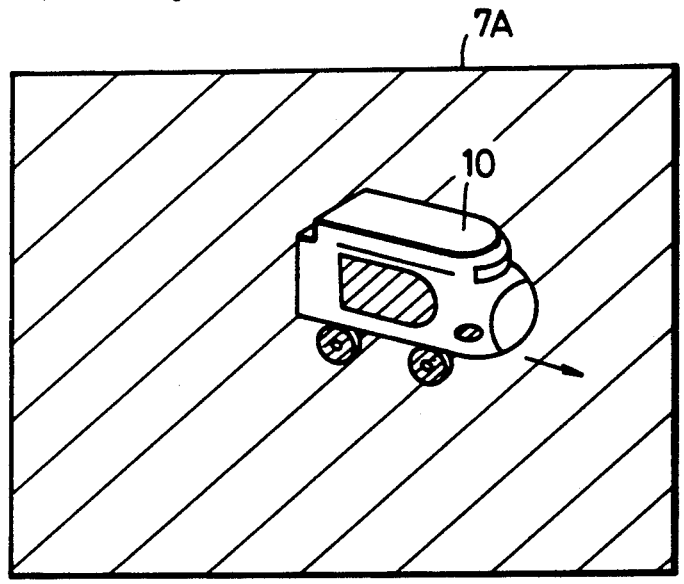
Figure 4A:
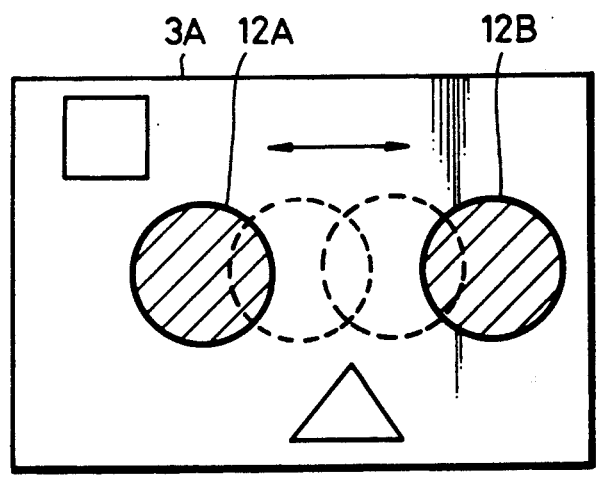
Figure 4B:
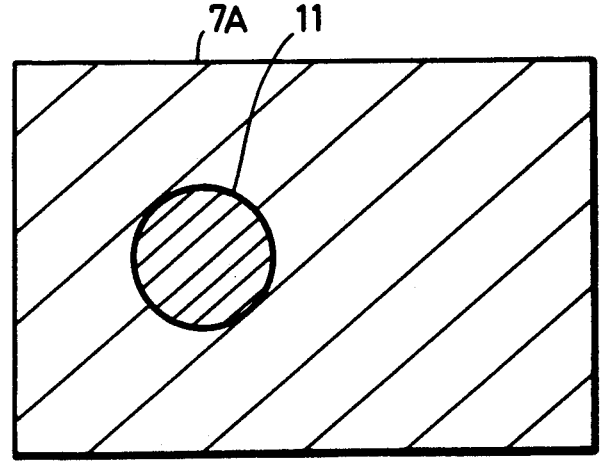
Figure 5A:
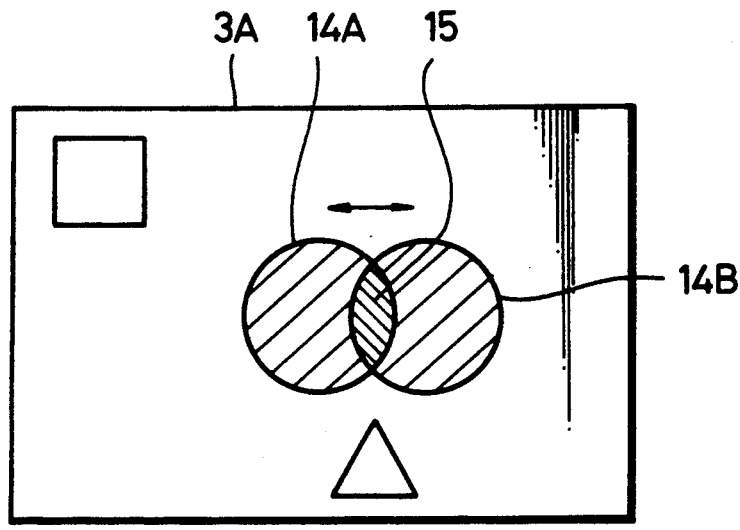
Figure 5B:
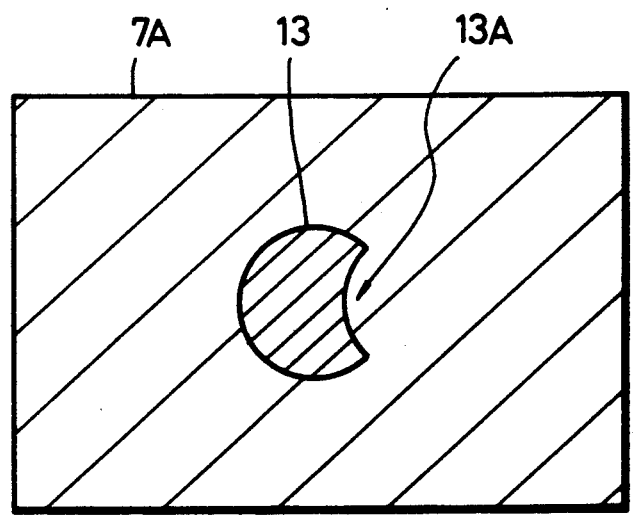
Figure 6:
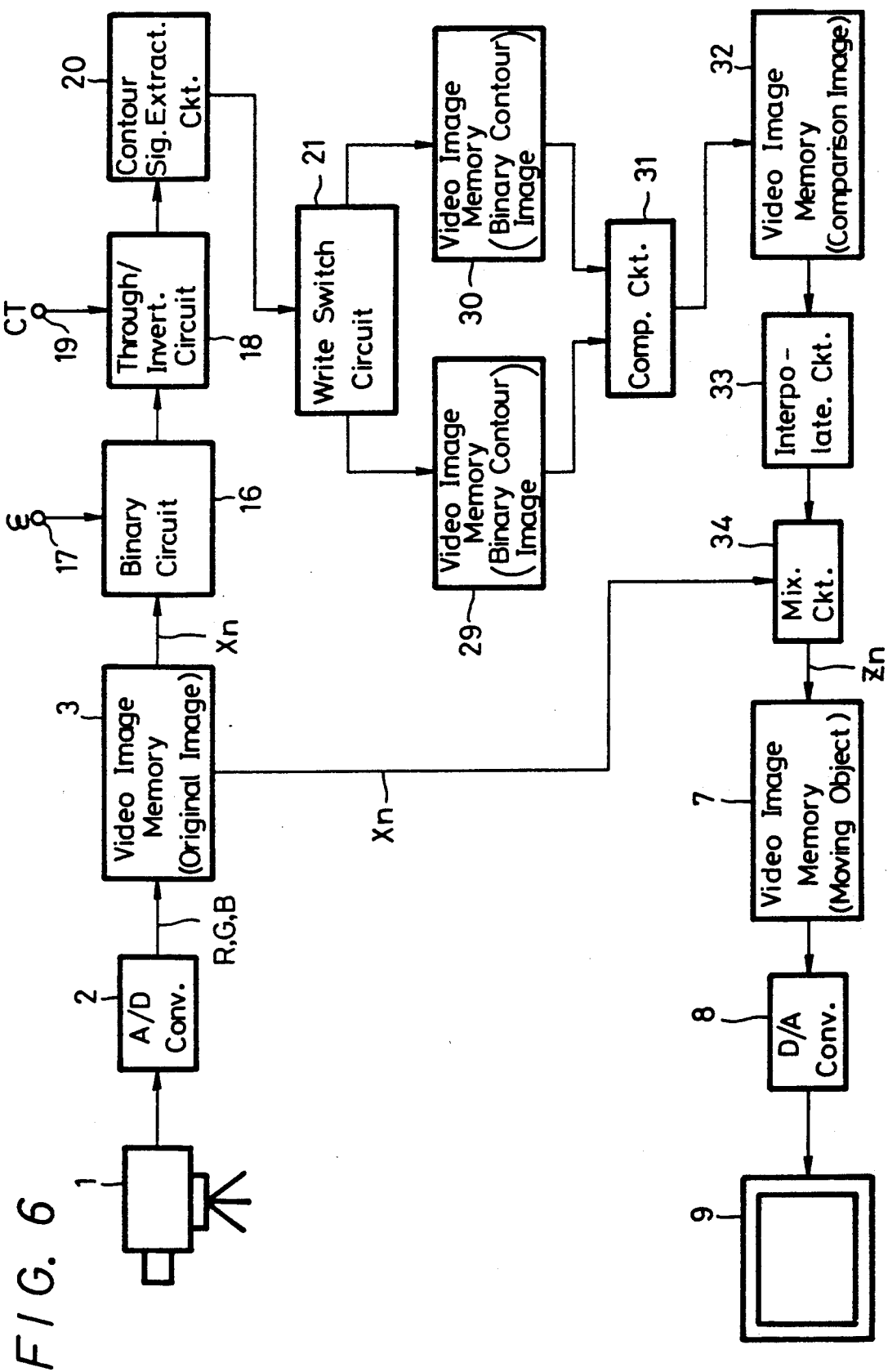
FIG. 6 is a functional block diagram showing an embodiment of an apparatus for detecting a moving object in a motion picture sequence according to the present invention.

FIG. 6 shows a functional block diagram of an image processing apparatus according to the present invention. In FIG. 6, like parts corresponding to those of FIG. 1 are marked with the same references and therefore need not be described in detail.

Referring to FIG. 6, R, G, B video signals $x_n^R$, $x_n^G$ and $x_n^B$ (these will be collectively referred to as $x_n$) representing the n'th frame of the original image sequence are read out from the video image memory 3 which stores the original image and input to a binary circuit 16 that converts these video signals $x_n$ into the binary form "0" or "1" according to threshold values $\epsilon^R$, $\epsilon^G$ and $\epsilon^B$ (collectively referred to as $\epsilon$ for simplicity) supplied thereto via an input terminal 17. In the illustrated embodiment, the binary coding processing and the following processing steps are carried out in parallel for each of the respective R, G, B components.

A direct/inverting circuit is shown at 18. The direct/inverting circuit 18 allows the binary video signal $x_n$ to be fed directly to a contour signal extracting circuit 20 in response to an externally supplied low level ("0") control signal CT at input terminal 19, whereas the direct/inverting circuit 18 inverts the binary video signal $x_n$ and supplies the inverted binary video signal $\bar{x}_n$ to the contour signal extracting circuit 20 in response to a high level ("1") control signal CT.

The contour signal extracting circuit 20 comprises a logic filter mask having 3 (horizontal direction)×3 (vertical direction) pixels which performs substantially the same function as that of the logic circuit shown in FIG. 7.

Referring to FIG. 7, data from 8 pixels 23 (Nos. 1 to 8) near a target pixel 22 are respectively supplied to 8 input terminals of an 8-input OR gate 24 whose output data is supplied to one input terminal of an exclusive-OR gate 25. Data from the target pixel 22 is supplied to the other input terminal of the exclusive-OR gate 25 whose output data (contour data) is supplied to a write switching circuit 21 (see FIG. 6).

When an original image is made up of, for example, 768 (horizontal direction)×512 (vertical direction) pixels, if the 768×512 pixels are used in succession as the target pixel 22 shown in FIG. 7 and the logic filter operation is performed, it is possible to extract the contour data from the original image without calculating a difference or the like.

For example, assuming that in the direct/inverting circuit 18 the control signal CT is at low ("0") and that a binary representation of the original image is composed of a right half wherein the pixels 26 are high ("1") and a left half wherein the pixels are low ("0"), then in a block 23A composed of 3 (horizontal direction)×3 (vertical direction) pixels, the data from the target pixel 22A is low ("0") and the ORed output of the data from the 8 pixels near the target pixel 22A is high ("1") with the result that the contour data for the target pixel 22A is set high ("1") as shown in FIG. 8B. Furthermore, when the target pixels are 22B and 22C in FIG. 8A, the data from target pixels 22B and 22C are high ("1") and the ORed output of the 8 pixels surrounding the target pixels 22B and 22C is high ("1") so that the contour data from these target pixels 22B and 22C is low ("0"), respectively. Therefore, with respect to the contour data of the original image shown in FIG. 8A, data from pixels 26A externally adjoining an image area at high level ("1") become high level ("1") as shown in FIG. 8B. Thus, by operation of the contour data extractor circuit 20 of this embodiment, it is possible to obtain accurate contour data.

Referring again to FIG. 6, there are provided binary contour image frame buffers 29 and 30, respectively. These frame buffers 29 and 30 each have a storage capacity of 3 bits (one bit for each component of R, G, B video signals) for each pixel, for example, for 768 (horizontal direction)×512 (vertical direction) pixels. Under the control of the write switching circuit 21, the contour data is alternately written to the frame buffers 29 and 30 so that when contour data from, for example, the (n-1)'th frame binary contour image is written to the frame buffer 30, contour data the n'th frame binary contour image is written to the frame buffer 29.

A comparison circuit 31 compares contour data from the n'th frame contour image stored in the frame buffer 29 (i.e., the contour from the most recent image) with the contour data from the (n-1)'th frame contour image stored in the frame buffer 30 (i.e., the contour of the previous image) to generate video image data from the compared images according to Table 1 below. This video image data is written to a frame buffer 32 which stores therein the comparison video image data. The storage capacity of this frame buffer 32 is equal to those of the frame buffers 29 and 30.

TABLE 1

| contour data of old video image | contour data of new video image | video image data of compared video image |
|---|---|---|
| 0 | 0 | 0 |
| 1 | 0 | 0 |
| 0 | 1 | 1 |
| 1 | 1 | 0 |

Figure 9:
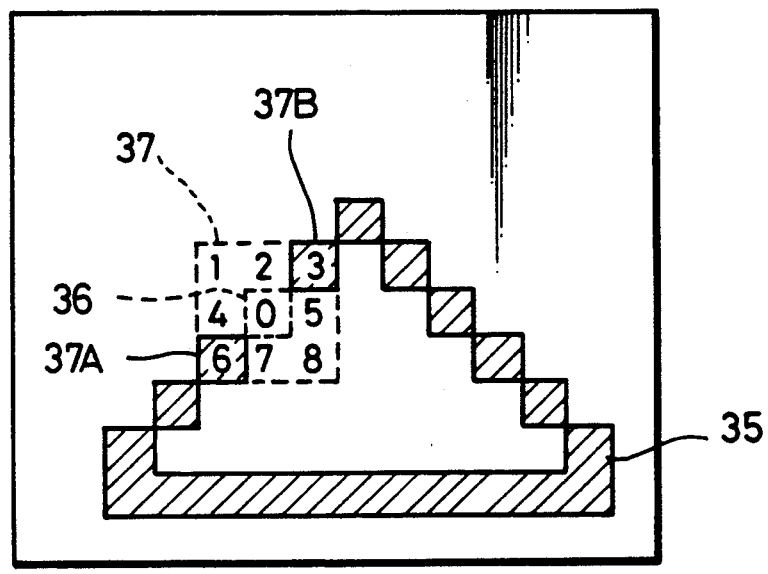
FIG. 9 is a schematic diagram illustrating the operation of the interpolator circuit used in the present invention.

More specifically, in the comparison image, only that portion in which the contour data of the new video image changes relative to the contour data of the old video image becomes a high level ("1") video image, and in the comparison video image, an area encompassed by the pixels having a high level ("1") corresponds to a moving object. However, it is frequently observed that the comparison video image itself causes a drop-out portion 36 to occur in one portion of the contour 35 of a partially moved object as shown in FIG. 9.

In this embodiment, in order to recover the drop-out portion 36, an interpolator circuit 33 (FIG. 6) is provided so as to cause video image data for a central pixel to go to high level ("1") when the video image data of separated pixels in the 8 pixels adjacent to the central pixel go to high level ("1"). Accordingly, in the case illustrated in FIG. 9, of 8 pixels 37 near the drop-out portion 36, the data of pixels 37A and 37B, separated from each other, are both at high level ("1") so that data at the drop-out portion 36 is determined to be at high level ("1").

Alternatively, instead of evaluating video image data of the 8 pixels adjacent to the drop-out portion 36, the interpolator circuit 33 may make its determination on the basis of video image data from four pixels adjacent to the drop-out portion 36 above, below, left and right.

Referring again to FIG. 6, the interpolator circuit 33 interpolates image data from the comparison video image stored in the frame buffer 32 and supplies the interpolated image data to one input terminal of a mixer circuit 34. The other input terminal of the mixer circuit 34 receives the n'th frame image video signal $x_n$ stored in the video image memory 3. Therefore, the mixer circuit 34 generates the n'th frame motion picture video signal $z_n$ from the video signal $x_n$ and the video image data from the comparison image, and supplies this n'th frame motion picture video signal $z_n$ to the motion picture video image memory 7.

Figure 10:
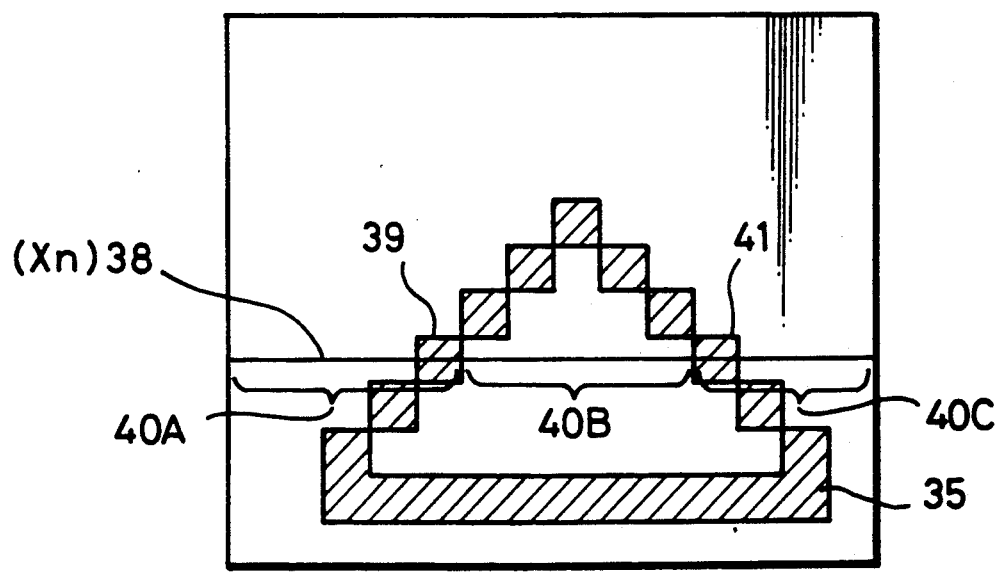
FIG. 10 is a schematic diagram illustrating the operation of the mixer circuit used in the present invention.

The operation of the mixer circuit 34 may be explained more fully in conjunction with, for example, a scan line 38 of the original image video signal $x_n$ as shown in FIG. 10.

As shown in FIG. 10, during an interval 40A until the scan line 38 encounters one edge 39 of the contour 35 (at high level ("1")) of the comparison picture, the mixer circuit 34 generates a pre-determined signal corresponding to a pre-determined color as the moving picture video signal "z"; during an interval 40B in which the scanning line 38 lies between one edge 39 and a second edge 41 of the contour 35, the mixer circuit 34 generates the original image video signal $x_n$ as the video signal $z_n$; and during an interval 40C after the scanning line 38 reaches the second edge 41 of the contour 35, the mixing circuit 34 generates a pre-determined signal corresponding to a pre-determined color as the video signal $z_n$. Consequently, the mixer circuit 34 extracts an original image stored in the video image buffer 3 and which corresponds to an area encompassed by the contour 35 of the comparison video image stored in the frame buffer 32 as an image of a moving object. This image of the moving object is displayed on the color display monitor 9.

The action of the direct/inverting circuit 18 of this embodiment will be now described in more detail.

Assuming an original picture sequence in which, for example, a bright moving object is moving on a dark background, then the control signal CT is set in low ("0") in the direct/inverting circuit 18 shown in FIG. 6. In that case, a video signal $x_n$ (see FIG. 11A) representing an object 27 in an original picture is coded in binary form (see FIG. 11B) on the basis of the threshold value $\epsilon$ and is directly supplied to the contour data extracting circuit 20, whereby pixels surrounding the object 27 form a contour (see FIG. 11C).

On the other hand, if the original image is such that a dark object is moving on a bright background, then the control signal CT is set high ("1") in the direct/inverting circuit 18 shown in FIG. 6. In that case, a video signal $x_n$ (see FIG. 12A) representing an object 28 in an original image is coded in binary form (see FIG. 12B) on the basis of the threshold value $\epsilon$, inverted by the direct/inverting circuit 18 as shown in FIG. 12C, and the thus inverted binary signal is supplied to the contour data extractor circuit 20. Consequently, pixels surrounding the area at high level ("1") shown in FIG. 12C are extracted to form a contour as shown in FIG. 12D.

As discussed with reference to FIGS. 8A and 8B, the contour extractor circuit 20 of this embodiment determines that the pixels surrounding the area at high level ("1") form a contour. Thus, when the object is at low level ("0"), there is then the substantial risk that the contour might be formed by pixels inside of the object. In order to remove this possibility, the operation of the mixer circuit 34 must be varied. However, if the direct/inverting circuit 18 is provided as in this embodiment, the object having a low level ("0") is inverted so that, similarly to the case where the object is at high level ("1"), the pixels outside of the object are extracted to form a contour. There is then the advantage that the accurate contour can always be extracted in addition to the possibility of executing the subsequent processing in the same way.

Figure 13:
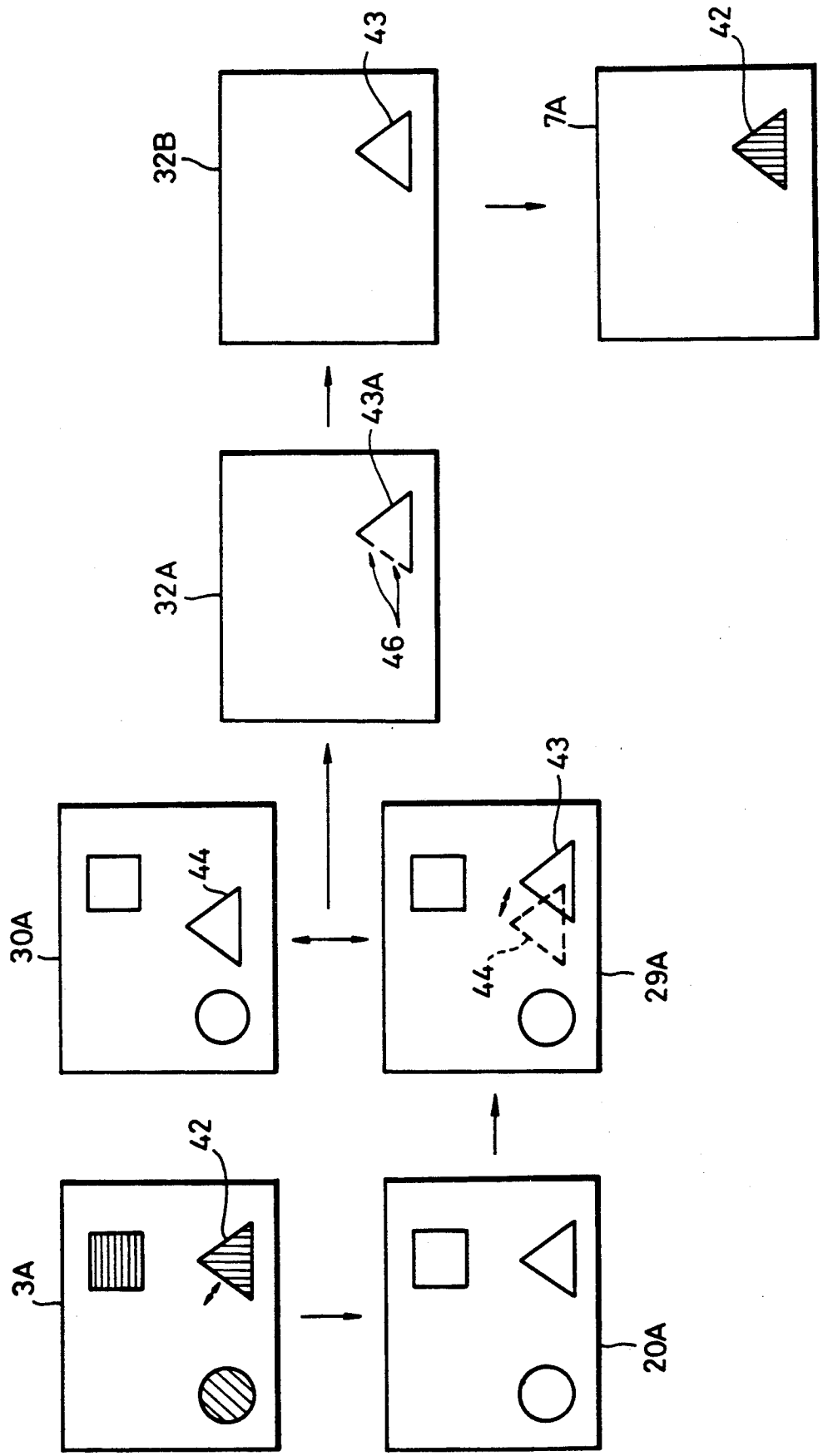
FIG. 13 is a schematic diagram illustrating the operation of the apparatus shown in FIG. 6.

Referring to FIG. 13, the operation of this embodiment is described for the case wherein a moving object in the original picture is a partially moving object. In that case, assume that a triangle 42 of high brightness is being moved in the original picture 3A as a partially moved object.

Initially, video data from the original image 3A is coded in binary form and the binary data undergoes the contour extracting processing to provide a binary contour image 20A. Then, a video signal representing the image 20A is written, for example, to the video image memory 29 as a video signal representing a contour 29A of a new image. In that case, although a video signal representing the contour 30A of the preceding image is written to the video image memory 30, as shown in FIG. 13, the contour 30A of the previous image and the contour 29A of the new image are different from each other in that a triangular contour 44 is changed into a triangular contour 43. In that case, the contours 44 and 43 cross each other, causing a drop-out portion 46 to occur in one portion of the triangular contour 43A in a comparison picture 32A in which a new contour portion is defined at high level "1". In this embodiment, the interpolation circuit 33 (see FIG. 6) is provided, whereby an interpolated picture 32B in which the drop-out portion 46 is made at high level "1" is generated. Therefore, by writing the triangle 42, provided as the moving object in the original picture 3A, in the triangle contour 43 in the interpolated picture 32B, it is possible to obtain a moving picture 7A.

As is clear from FIG. 13, even when the triangle 42 is only partially moved in the original image 3A and thereby overlaps the triangle of the preceding frame, the complete triangle 42 can be extracted in the resultant moving picture 7A. According to this embodiment, as described above, there is the substantial advantage that the moving object can be accurately detected even when the moving object is a partially moved object. Further, in accordance with this embodiment, the moving object is detected in parallel for the R, G and B color video signal components so that, even when the moving object has a single color, the moving object can be accurately detected.

Furthermore, in this embodiment, only the binary contour video image from the preceding frame is stored and a background image which is slow in convergence need not be generated. There is then the advantage that the moving object can be detected using the second frame of the original image. In that case, considering the storage capacity of the binary contour image with respect, for example, to the R component, it is to be appreciated that each of the frame buffers 29, 30 and 32 has a storage capacity of one bit per pixel. Whereas, when the background image is used according to the prior art, a storage capacity of 8 bits per pixel is needed for the R component. Therefore, according to this embodiment, the storage capacity of the video image memory for processing video data can be reduced to ⅜ of that needed by the prior art.

Furthermore, in this embodiment, as is clear from the aforesaid Table 1, the portion in which the contour data of the old image is low ("0") and the portion in which the contour data of the new image is high ("1") are extracted as contours of the moving object so that, when a certain object suddenly disappears from the picture, such an object can be prevented from being detected as a moving object. On the other hand, in the method for detecting the existence or nonexistence of the moving object from the difference between the preceding and succeeding frames, there is the substantial disadvantage that a certain object is detected as a moving object when it suddenly disappears from the screen as well as when it suddenly appears on the screen.

Although the present invention has been described so far with reference to the functional block diagram in order to gain a better understanding of the invention, in actual practice, the functions of the respective circuits shown in FIG. 6 are realized by computer software (see Japanese Patent Laid-Open Gazette No. 62-118480 or [A Multiprocessor System for Video Image Processing, "SIPS"] in Journal of Computer Vision, published on 11/21/1985).

Further, the original image video image memory 3 and the moving picture video image memory 7 can be made common.

According to this invention, since a moving object can be detected using only the reduced amount of stored information that defines its contour in the previous image, no background image has to be generated and the moving object can be detected using the second frame of the original image sequence. Furthermore, partially moved object can be accurately detected.

Having described a preferred embodiment of the invention with reference to the accompanying drawings, it is to be understood that the invention is not limited to that precise embodiment and that various changes and modifications could be effected by one skilled in the art without departing from the spirit or scope of the novel concepts of the invention as defined in the appended claims.

I claim as my invention:

1. An apparatus for detecting a moving object in a motion picture sequence comprising:
   (a) input means for receiving the motion picture sequence;
   (b) a first memory device for storing the motion picture sequence as digitized pixels;
   (c) means connected to said first memory device for extracting a contour image signal from the motion picture sequence;
   (d) second and third memory devices for storing, as digitized pixels, the contour image extracted from each of two successive frames of the motion picture signal, respectively;
   (e) a fourth memory device for storing transition data generated by comparing the contour signals stored in said second and third memory devices;
   (f) means connected to said fourth memory device for interpolating an output signal of said fourth memory device so that a new transition is generated at a pixel position located between pixels representing a transition; and
   (g) means for combining output signals of said interpolating means and said first memory device whereby a moving object in the motion picture sequence is detected.

2. The apparatus according to claim 1, in which said extracting means includes a bit compression circuit wherein an eight bit code signal is converted to one bit code signal using a pre-determined threshold level, and a contour extracting circuit.

3. The apparatus according to claim 2, in which said second and third memory devices store data having zero "0" or one "1" level data.

4. An apparatus for detecting a moving area in a video signal comprising:
   (1) input means for receiving the video signal as digitized pixels;
   (2) means for extracting a contour image signal composed of digitized pixels from said video signal;
   (3) means for detecting a transition between corresponding pixels of two successive frames of said extracted contour image signal;
   (4) means for interpolating a transition in a pixel in said contour image signal having no transition when a transition occurs in the vicinity of said pixel, and for outputting a signal corresponding to said interpolated transition; and
   (5) means for combining output signal of said interpolating means and the signal of said input means whereby said moving area of said video signal is detected.

5. A method for extracting an image of a moving object in a motion picture sequence comprising successive image frames comprised of pixels having a range of brightness values comprising:
   converting pixels in image frames of a sequence of motion picture images, said pixels having a range of brightness values, to two-level binary brightness values;
   extracting a contour image from a first frame of said converted pixels;
   extracting a contour image from a second frame of said converted pixels;
   comparing said contour images of said first and second frames and generating an image comprising the pixels undergoing a transition between said first frame and said second frame.

6. The method of claim 5 wherein said first frame and said second frame are successive frames of said sequence of motion picture images.

7. Apparatus for detecting a moving object in a motion picture sequence comprising successive image frames comprising:
   first storage means for storing an image frame of a motion picture sequence in digital form;
   means connected to said storage means for extracting a contour image from said image frames stored therein;
   second and third storage means for storing contour images extracted from two frames of said motion picture sequence; and
   means for comparing said contour images in said second and third storage means to generate a difference contour image.

8. The apparatus of claim 7 wherein said two frames are successive frames.

9. The apparatus of claim 7 additionally comprising:
fourth storage means for storing said difference contour image;
means for locating discontinuities in said difference contour image and for interpolating said discontinuities, whereby an interpolated difference contour image is generated; and
means for combining said interpolated difference contour image with said image stored in said first storage means.

10. The apparatus of claim 9 wherein said two frames are successive frames.

* * * * *